United States Patent Office 3,296,181
Patented Jan. 3, 1967

3,296,181
PHENOLIC-FORMALDEHYDE RESINS CONTAINING AN ALKYL PHENOL WHEREIN THE ALKYL GROUP CONTAINS 5–15 CARBON ATOMS AND INK COMPOSITIONS THEREFROM
Albert Wurmli and Roderich Konig, Riehen, near Basel, Switzerland, assignors to J. R. Geigy A.-G., Basel, Switzerland
No Drawing. Filed Feb. 16, 1961, Ser. No. 89,625
Claims priority, application Switzerland Feb. 17, 1960, 1,776/60; Mar. 24, 1960, 3,322/60; Feb. 3, 1961, 1,156/61
10 Claims. (Cl. 260—33.2)

The invention concerns formaldehyde condensation resins suitable for flexopressic printing inks as well as for inks for ink pads and ball point pens.

Because of their vivid shades, alcoholic solutions of basic dyestuffs are used as printing colours in the so-called flexopressic printing. Tannin is added to such alcoholic solutions as fixing agent to improve the wet fastness properties of the prints. As tannin is not available everywhere in sufficient amount and quality for this purpose, there is a need for a complete substitute therefor by synthetic products manufactured from technically easily available starting substances.

It has now been found that flexopressic printing inks and also inks for ink pads and ball point pens which sufficiently fulfill all technical requirements are obtained by adding, as fixing agents, resins which are soluble in alcohol to the alcoholic solutions of basic dyestuffs. Such resins are produced as follows:

A monophenol which can easily be dimethylolated or a mixture of such monophenols, is reached in aqueous-alkaline medium at the suitable, generally slightly raised temperature with more than one equivalent and less than two equivalents of formaldehyde and the isolated reaction product is condensed at temperatures of over 100° C. advantageously at 120–140° C., simultaneously or stepwise with 0.5 to 0.75 equivalent (calculated on the dimethylolatable monophenol) of a mixture of phenol compounds which can be methylolated, such phenol compounds consisting of alkyl phenols containing at least 5 alkyl carbon atoms and of hydroxybenzene carboxylic acids in a molecular ratio of 1:1 to 1:2.5.

Hydroxybenzenes which can easily be dimethylolated are those in which at least two of the o- and p-positions to the hydroxyl group are unsubstituted. They can be substituted in the remaining positions by non-ionogenic substituents such as halogen, alkyl or alkoxy groups. For example o-cresol, p-cresol, a cresol mixture (o-, m- and p-cresols), a chlorophenol, methoxy phenol, phenol or mixtures of any of the foregoing have been found suitable. In particular methyl homologues of phenol and mixtures thereof can be used and, particularly favourable and therefore preferred, is o-cresol. As aqueous-alkaline medium in which the condensation with the formaldehyde is performed, concentrated aqueous solutions of alkali metal hydroxides are used in amounts which are about equivalent to or moderately exceed the phenolic hydroxyl groups. The condensation temperature and time depend on the reactivity of the phenols used; temperatures of 20 to 80° C., advantageously 40° C. to 60° C. and reaction times of a few hours are suitable. The formaldehyde is used advantageously in the form of the usual marketed concentrated aqueous solutions and the amount (calculated on the dimethylolatable monophenol) is 1.2 to 1.8 equivalents, advantageously about 1.5 equivalents. The formaldehyde condensation products of the first step are isolated advantageously by neutralizing the reaction mixture with a strong mineral acid such as hydrochloric acid or sulphuric acid until the pH is 7 whereupon the methylol compounds formed are obtained as oils or wax-like masses which can be easily separated from the aqueous mother lye by decantation. Sometimes the aqueous mother lyes can afterwards be extracted with organic solvents such as ether or butanone-2 and, after distilling off the organic solvents, the extracts can be combined with the main product.

The further condensation is performed in the melt at over 100° C. advantageously at 120–140° C.

Compounds which can easily be methylolated, advantageously those having two unsubstituted positions ortho and para to the hydroxyl group are used as alkyl phenols. Advantageously the alkyl carbon atoms form a single substituent and this has, advantageously, 5 to 15, particularly 8 to 12 carbon atoms. For example, octyl phenol, nonyl phenol, dodecyl phenol or pentadecyl phenol and also tertiary amyl phenol can be used. Mixtures of the foregoing alkyl phenols can also be used.

Salicylic acid is principally used as hydroxybenzene carboxylic acid. However, if desired also cresotic acids, halogen substituted salicylic acids or p-hydroxybenzoic acids having at least one free position ortho or para to the hydroxyl group can also be used. Thus the hydroxybenzene carboxylic acids would include salicylic acid, the cresotic acids, p-hydroxybenzoic acid, chlorosalicyclic acid as well as mixtures of two or more of the foregoing.

The molecular ratio of alkyl phenol to hydroxybenzene carboxylic acid is advantageously 1:2, but it can also be varied within the limits defined.

Advantageously the mixture of the components is condensed in the melt for a few hours at about 120–130° C. until the splitting off of water is to all intents and purposes complete. Alkyl phenol also removed with the steam is returned to the melt. Sometimes it is advantageous at the end of the condensation, to liberate the condensation product from non-condensed excess alkyl phenol by the introduction of steam.

The melt of the intermediate formaldehyde condensation resin can also be further condensed, in any order desired, with the alkyl phenol and the hydroxybenzene carboxylic acid, but the single step process is more advantageous.

A modification of the process above described for the production of the formaldehyde condensation resins consists in condensing the monophenol, formaldehyde, alkyl phenol and hydroxybenzene carboxylic acid simultaneously in an aqueous-acid medium. The ratio of the components remains the same, that is more than one and less than two equivalents of formaldehyde and 0.5 to 0.75 equivalent of methylolatable phenol compounds per mol of dimethylolatable monophenol, the methylolatable pheno compounds consisting of alkyl phenols having at least 5 alkyl carbon atoms and hydroxybenzene carboxylic acids in molecular ratio of 1:1 to 2.5. The mixture of the components is heated from 5 to 20 hours at 90–110° C. until the condensation is complete, advantageously for 7 to 15 hours at 95–105° C. In this process too, the formaldehyde is used in the form of the concentrated aqueous solution. In principle, the amount of hydroxybenzene carboxylic acid used is sufficient to ensure the necessary acid medium, but in order to accelerate the condensation, it is advantageously performed in the presence of an acid catalyst such as, e.g., hydrochloric acid, sulphuric acid, phosphoric acid, oxalic acid, formic acid, acetic acid or lactic acid. The greasy resin obtained is isolated advantageously by evaporating off the water at 110–120° C., any inorganic acids present being previously washed out.

On cooling, the condensation products so produced solidify into glassy resins which can be pulverised. When uncoloured starting materials are used, the resins are pale yellowish to at most pale brownish coloured. They are very easily soluble in ethanol; they also dissolve well in methanol, isopropanol, butanol, glycol monomethyl and gycol monoethyl ether, in ethyl acetate, butyl acetate, acetone and methylethyl ketone. In spirits they are up to 50% soluble. These formaldehyde condensation resins are, therefore, excellently suitable for the production of printing colours for flexopressic printing as well as for ink pads and ball point pens with solutions of basic dyestuffs.

Flexopressic printing inks are obtained by dissolving basic dyestuffs and a formaldehyde condensation resin produced according to the invention in low boiling alcohols, e.g., methanol, ethanol, and preferably, ethanol. To produce a flexopressic printing ink, for example, 10 parts of basic dyestuff such as Auramine, Rhodamine B, Crystal Violet, Victoria Blue, Malachite Green, and 20 parts of one of the formaldehyde condensation resins according to the invention are dissolved in 70 parts of ethanol. The prints attained on aluminum foils and cellulose paper with such inks are distinguished by excellent water fastness and in this connection, they equal or exceed the fastnesses of prints produced on using tannin. In addition, the printing inks produced with the formaldehyde condensation resins according to the invention are very stable, they have no tendency to flake out or separate in the form of rubber-like gels, any residual staining of the containers is not difficult to remove ("high tide marks") and they cause no noticeable corrosion when stored in tin plate containers. The colour of the prints attained with the printing inks according to the invention is of unclouded purity.

Inks for ink pads are obtained if higher boiling alcohols, esters or mixtures thereof are used as solvent. For this purpose, alcohols are preferred over the esters as solvents.

Monoalcohols boiling at over 100° C., for example are used as high boiling alcohols, in particular araliphatic alcohols, e.g., benzyl alcohol. Advantageously however, polyalcohols boiling above 100° C. are used, e.g., alkylene glycols such as 1,2-propylene glycol, but preferably polyalkylene glycol, particularly polyethyene glycols, mainly di- or tri-ethylene glycol.

Those esters boiling above 100° C. are used advantageously which are derived from low saturated aliphatic monocarboxylic acids, in particular from acetic or lactic acid, and from the alcohols mentioned above. Benzyl acetate or lactate or diethylene glycol mono- or di-acetate or diethylene glycol mono- or di-lactate or glycerin di- or tri-acetate are given as examples. Also mixtures of the solvents given above can be used.

The inks for ink pads produced according to the invention are very stable and only dry, for example on ink pads, with great difficulty. Prints attained therewith on cellulose paper are very pure and of good colour strength. They are distinguished by their good stability to water and, in this connection, their fastness is superior to that of prints produced from tannin. In contrast to the usual marketed inks for ink pads, the prints are completely stable to water immediately after stamping.

In addition, also inks for ball point pens are obtained if esters and, advantageously, high boiling alcohols (both boiling at over 100° C.) or mixtures thereof are used as solvents. The solvents mentioned for ink pad inks are used for this purpose as well. In particular, benzyl alcohol and also polyalkylene glycols such as diethylene glycol monomethyl ether and dipropylene glycol are used.

Basic dyestuffs are also used for the production of inks for ball point pens. They are used in particular as dye bases and also in the form of their salts, for example, in the form of their hydrohalides such as hydrochlorides. Examples of such dyestuffs usable according to the invention are Auramine, Rhodamine B, Crystal Violet, Victoria Blue B, Malachite Green and also the marketed products of Astra Blue 6 GLL or Maxilone Blue RL.

The inks for ball point pens produced according to the invention are very stable and do not dry up, for example, in ball point pens or refills. Impressions made therewith on paper are extraordinarily pure and of strong colour. They are distinguished by very good fastness to water and solvents.

The amounts of components in the inks can vary. Particularly advantageous inks for ink pads contain about 10 parts of basic dyestuffs and about 90 parts of a mixture of organic solvent and resin. Particularly advantageous inks for ball point pens contain about 20 parts of basic dyestuff and about 80 parts of a mixture of organic solvent and resin.

The following examples illustrate the invention. Where not otherwise expressly stated, parts are given herein as parts by weight. The temperatures are in degrees centigrade. The relationship of parts by weight to parts by volume is as that of kilogrammes to litres.

Example 1

108 parts of o-cresol, 200 parts of water and 147 parts of 30% caustic soda lye are mixed. 145 parts of 37% formaldehyde solution are added at 60°. After condensing for 5 hours at 60°, the condensation product is neutralised with 40% sulphuric acid and the oil formed is separated. The aqueous phase is extracted with ether and the oil obtained after evaporating off the ether is added to the main product. The total amount of oil is heated for 6 hours at 135° with 76 parts of o-cresotic acid and 55 parts of nonyl phenol, the alkyl phenol which at the beginning distills over with the steam being replaced. After complete evaporation off of the water, a resin is obtained which solidifies in a glassy form.

A resin having the same properties is obtained if the nonyl phenol is replaced by the same amount of octyl phenol.

To produce a printing colour, 1 part of Auramine 000 and 2.5 parts of the above resin are dissolved in 6.5 parts of ethyl alcohol. Very clear and wet-fast prints are obtained with this ink on aluminum foils.

Example 2

54 parts of p-cresol, 54 parts of o-cresol, 200 parts of water and 160 parts of 30% caustic soda lye are mixed, 122 parts of 37% formaldehyde are added and the mixture is stirred for 10 hours at 40°. After neutralising with hydrochloric acid, the oil obtained is condensed for 10 hours at 125° with 34.5 parts of salicylic acid and 55 parts of nonyl phenol. Traces of alkyl phenol still present are removed with steam. The water is then evaporated off until the resin solidfies in the cold in glassy form.

A suitable priting colour is obtained by dissolving 1 part of Victoria Blue B conc. and 1 part of resin in 8 parts of methyl alcohol. The prints obtained with this ink on aluminum foils have excellent wet fastness properties.

Example 3

108 parts of o-cresol, 100 parts of water and 147 parts of 30% caustic soda lye are mixed, 98 parts of 37% formaldehyde are added and the mixture is stirred for 10 hours at 70°. The oil obtained by neutralising with 40% sulphuric acid is further condensed with 57 parts of salicylic acid and 29.5 parts of amyl phenol at 140°. After condensing for 5 hours, the product is treated with steam and then dehydrated while stirring at 120°. A brittle resin is obtained.

If the salicylic acid is replaced by 70 parts of 5-chloro-salicylic acid, then a resin having similar properties is obtained.

2 parts of this resin are dissolved with 1 part of Rhodamine B extra in 7 parts of ethyl alcohol to form a printing colour. Pure, red, wet-fast prints are obtained therewith on cellulose paper.

Example 4

108 parts of o-cresol, 100 parts of water and 147 parts of 30% caustic soda lye are mixed. 129 parts of 37% formaldehyde are added at 50° and the mixture is stirred for 3 hours at 50°. An oil which can easily be separated is obtained by neutralising with technical hydrochloric acid. All the oil obtained is condensed at 125° with 57 parts of o-hydroxybenzoic acid and 50 parts of nonyl phenol until a viscous resin is obtained. The resin is worked up as described in the previous example.

The o-hydroxybenzoic acid can also be replaced by 63 parts of o-cresotic acid.

1 part of 5-(4'-diethylaminophenylazo)-1-methyl-1,2,3-triazolium chloride and 2.4 parts of resin are dissolved in a mixture of 3 parts of glycol monomethyl ether and 3.6 parts of ethyl alcohol. Printing colours are obtained which produce pure, red, wet-fast prints on aluminum-coated paper.

Example 5

108 parts of technical cresol mixture, 100 parts of water and 140 parts of 30% caustic soda lye are mixed. 142 parts of 37% formaldehyde are added at 55°. The mixture is stirred for 3 hours at 55° and then neutralised with hydrochloric acid. The oil formed is mixed with 50 parts of p-hydrobenzoic acid and condensed for 1 hour at 125°. 50 parts of nonyl phenol are then added and the condensation is continued at the same temperature for 5 hours. The product is worked up as described in Example 3. A yellow, brittle resin is obtained.

1 part of Malachite Green and 1.6 parts of resin are dissolved in 7.4 parts of ethyl alcohol. Pure, green, wet-fast prints are obtained on aluminum foils with this printing colour.

Example 6

54 parts of o-cresol, 66 parts of p-chlorophenol, 100 parts of water and 140 parts of 30% caustic soda lye are mixed. After adding 125 parts of 37% formaldehyde, the mixture is stirred for 3 hours at 55°. The mixture is neutralised with hydrochloric acid and the oil which has separated is mixed with 50 parts of salicylic acid and 60 parts of pentadecyl phenol. The mixture is heated for 3 hours at 105° and then treated with steam until no more volatile phenols distill off. The water is then evaporated off at 120° until, in the cold, the resin solidifies.

The solution of 1.6 parts of the above resin and 1 part of Crystal Violet in 7 parts of ethyl alcohol produces a printing colour which gives pure violet, wet-fast prints on cellulose paper.

Example 7

11 parts of amyl phenol and 80 parts of 5-chlorosalicylic acid are mixed with the oily reaction product obtained after the neutralisation according to Example 6. The mixture is heated for 5 hours at 110° and the product is worked up as described in Example 6. A brittle, reddish coloured resin is obtained.

2 parts of the above resin and 1 part of Rhodamine 6 GDN are dissolved in 7 parts of ethyl alcohol. This printing colour produces prints on aluminium foils which have good wet fastness properties.

Example 8

84 parts of p-cresol, 40 parts of octyl phenol, 80 parts of o-cresotic acid and 110 parts of 37% formaldehyde are thoroughly mixed and then 4 parts of oxalic acid are added. The mixture is heated to 95—100° and kept under reflux at this temperature for 10 hours. At the end of this time, an aqueous phase and a viscous resin are formed. The water is evaporated off by slowly increasing the temperature to 110–120° until the resin which remains solidifies in the cold.

2 parts of this resin and 1 part of Rhodamine B extra are dissolved in 7 parts of ethyl alcohol to form a printing colour. Wet-fast prints are obtained therewith on aluminium foils.

A resin with practically the same properties is obtained if in the above example the 40 parts of octyl phenol are replaced by 60 parts of pentadecyl phenol.

Example 9

42 parts of o-cresol, 42 parts of p-methoxyphenol, 40 parts of nonyl phenol and 46 parts of salicylic acid are mixed. After adding 2 parts of formic acid and 90 parts of formaldehyde 37%, the mixture is heated to 97° and stirred for 12 hours at this temperature. After evaporating off the water at 110–120°, a viscous resin remains which solidifies in brittle form in the cold.

A printing colour is produced by dissolving 2 parts of this resin with 1 part of Malachite Green in 7 parts of ethyl alcohol. Green, wet-fast prints are obtained therewith on cellulose paper.

Example 10

86 parts of o-cresol, 40 parts of nonyl phenol, 46 parts of salicylic acid, 102 parts of 37% formaldehyde and 6 parts of concentrated hydrochloric acid are thoroughly mixed, heated to 95–100° and the mixture is kept under reflux at this temperature for 5 hours. The viscous resin is then boiled down twice with water to remove the hydrochloric acid. After removal of the aqueous phase, the resin which remains is heated to 110° and the water is simultaneously evaporated off until the resin solidifies in the cold.

If 1.7 parts of this resin and 1 part of Victoria Blue B conc. are dissolved in 7 parts of ethyl alcohol, then a printing colour is obtained with which excellently wet-fast prints on aluminium foils are obtained.

Example 11

94 parts of phenol, 98 parts of o-cresotic acid, 20 parts of amyl phenol, 112 parts of 37% formaldehyde and 5 parts of 80% acetic acid are mixed and the mixture is refluxed for 15 hours. The whole reaction mass is then subjected to steam distillation until no more phenolic bodies distill over. After removal of the aqueous phase, the water is removed from the remaining resin by heating to 100–120°.

2 parts of the resin and 1 part of Rhodamine B extra are dissolved in 7 parts of ethyl alcohol. Pure red, wet-fast prints are obtained therewith on aluminum foils.

Example 12

10.0 parts of Rhodamine B extra and 20.0 parts of the formaldehyde condensation resin described in Example 4 are dissolved in 70.0 parts of technical triethylene glycol. An ink for ink pads is obtained which gives very clear prints on cellulose paper. The prints are wet-fast immediately after stamping.

Inks for ink pads having similarly good properties are also obtained with the resins described in Examples 2, 3, 5, 8 and 11.

If instead of the 10.0 parts of Rhodamine B extra, the same number of parts of Malachite Green, Victoria Blue B conc. Auramine 000 or Crystal Violet conc. are used and otherwise the procedure described in the above example is followed, then inks for ink pads are obtained which also produce very clear and excellently wet-fast green, blue, yellow or violet prints on cellulose paper.

Example 13

10.0 parts of Crystal Violet conc. and 10 parts of the formaldehyde condensation resin described in Example 1 are dissolved in 80.0 parts of technical triethylene glycol.

An ink for ink pads is obtained which produces clear, violet prints on cellulose paper which, even immediately after printing, are wet-fast.

Example 14

10.0 parts of Crystal Violet conc. and 20.0 parts of the formaldehyde condensation resin described in Example 10 are dissolved in 70.0 parts of diethylene glycol.

The violet prints on cellulose paper attained with an ink for ink pads so produced are very clear and, even immediately after printing, are completely wet-fast.

If in the above example, the 70.0 parts of diethylene glycol are replaced by the same number of parts of 1,2-propylene glycol and otherwise the procedure described in the example is followed, then inks for ink pads are obtained which also produce clear and wet-fast violet prints on cellulose paper.

Example 15

15.0 parts of Rhodamine B extra and 30.0 parts of the formaldehyde resin described in Example 4 are dissolved in 50.0 parts of technical benzyl alcohol. An ink for ball point pens is obtained which produces very clear impressions on cellulose paper which, even immediately after writing, are fast to water and solvents.

Inks for ball point pens having similarly good properties are also obtained with the resins described in Examples 1, 3, 5, 8 and 11.

If instead of the 15.0 parts of Rhodamine B extra, the same number of parts of Malachite Green, Auramine 000, Crystal Violet conc. or Maxilone RL (Geigy A. G., Basel, Switzerland) are used and otherwise the procedure described in the example is followed, then inks for ball point pens are obtained which produce very clear and excellently fast green, yellow, violet or blue impressions.

Example 16

20.0 parts of Victoria Blue B (as dye base) and 20 parts of the formaldehyde condensation resin described in Example 2 are dissolved in 60.0 parts of technical dipropylene glycol.

An ink for ball point pens is obtained which produces clear blue impressions on cellulose paper which are fast immediately after writing.

Example 17

20.0 parts of Astra Blue 6GLL (as dye base) (Bayer, Leverkusen, Germany) and 20.0 parts of the formaldehyde condensation resin described in Example 10, are dissolved in 60.0 parts of diethylene glycol monoethyl ether.

The blue impressions obtained with this ink for ball point pens on cellulose paper are very clear and, immediately after writing, are completely wet-fast and fast to solvents.

If in the above example, the 60.0 parts of diethylene glycol monoethyl ether are replaced by the same number of parts of 1,2-propylene glycol and otherwise the procedure described in the example is followed, then ink for ball point pens are obtained which also produce clear and fast blue impressions on cellulose paper.

What we claim is:
1. A resinous condensation product of
   (a) one equivalent part of dimethylolatable phenol,
   (b) more than one and less than two equivalent parts of formaldehyde, and
   (c) 0.5 to 0.75 equivalent part of a mixture consisting essentially of
      ($\alpha$) 1 molar proportion of alkyl phenol, the alkyl radical of which contains from 5 to 15 carbon atoms, and
      ($\beta$) from 1 to 2.5 molar proportions of hydroxybenzene carboxylic acid having at least one free position at the ortho- or para-positions relative to the hydroxy group,
from which condensation product all water of condensation has been split off, said product being suitable as base in flexo-pressic printing inks and capable of reducing the tendency of such inks to flake out and to form rubber-like gels therein.

2. A resinous condensation product according to claim 1, wherein the dimethylolatable monophenol is o-cresol, the alkyl phenol is nonyl phenol and the hydroxy-benzene carboxylic acid is salicyclic acid.

3. A resinous condensation product according to claim 1, wherein about 1.5 equivalents of formaldehyde and about 0.65 equivalent of said mixture containing the alkyl phenol and hydroxybenzene carboxylic acid, in a molecular ratio of about 1:2, is employed.

4. An ink composition containing the resin of claim 1, an organic solvent and a basic dyestuff.

5. An ink composition suitable as a printing ink containing the resin of claim 1, a low boiling alcohol and a basic dyestuff.

6. An ink composition according to claim 5 wherein the solvent is ethanol.

7. An ink composition suitable for ink pads and ball point pens containing the resin of claim 1, a high boiling organic solvent and a basic dyestuff.

8. An ink composition according to claim 7 wherein the organic solvent is a polyalkylene glycol.

9. A ball point ink composition according to claim 7 wherein the organic solvent is benzyl alcohol.

10. An ink composition for ink pads according to claim 7 wherein the organic solvent is triethylene glycol.

References Cited by the Examiner

UNITED STATES PATENTS

| | | | |
|---|---|---|---|
| 2,437,981 | 3/1948 | Stephan et al. | 260—57 |
| 2,457,493 | 12/1948 | Redfern | 260—57 |
| 2,520,913 | 9/1950 | Clark | 260—57 |
| 2,755,267 | 7/1956 | Finholt | 260—33.2 |
| 2,857,354 | 10/1958 | Fang | 260—33.2 |
| 3,020,254 | 2/1962 | Less et al. | 260—38 |
| 3,053,807 | 9/1962 | Lederman | 260—57 |

OTHER REFERENCES

Martin: Chemistry of Phenolic Resins, New York, Wiley, 1956.

WILLIAM H. SHORT, *Primary Examiner.*

LEON J. BERCOVITZ, *Examiner.*

L. G. KASTRINER, V. A. MORGENSTERN, H. E. SCHAIN, *Assistant Examiners.*